US010075842B2

(12) United States Patent
Zhou et al.

(10) Patent No.: US 10,075,842 B2
(45) Date of Patent: Sep. 11, 2018

(54) PHYSICAL CELL IDENTIFIER ALLOCATION METHOD AND APPARATUS

(71) Applicants: SHANGHAI DATANG MOBILE COMMUNICATIONS EQUIPMENT CO., LTD., Shanghai (CN); DATANG MOBILE COMMUNICATIONS EQUIPMENT CO., LTD., Beijing (CN)

(72) Inventors: Wenqian Zhou, Beijing (CN); Yusong He, Beijing (CN)

(73) Assignees: Shanghai Datang Mobile Communications Equipment Co., Ltd., Shanghai (CN); Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 15/114,825

(22) PCT Filed: Jan. 27, 2015

(86) PCT No.: PCT/CN2015/071630
§ 371 (c)(1),
(2) Date: Jul. 27, 2016

(87) PCT Pub. No.: WO2015/110085
PCT Pub. Date: Jul. 30, 2015

(65) Prior Publication Data
US 2016/0345168 A1 Nov. 24, 2016

(30) Foreign Application Priority Data
Jan. 27, 2014 (CN) .......................... 2014 1 0039004

(51) Int. Cl.
*H04W 8/26* (2009.01)
*H04W 24/02* (2009.01)
(Continued)

(52) U.S. Cl.
CPC ............ *H04W 8/26* (2013.01); *H04B 17/318* (2015.01); *H04B 17/336* (2015.01);
(Continued)

(58) Field of Classification Search
CPC ....... H04W 8/26; H04W 16/10; H04W 24/10; H04B 17/309–17/345; H04L 5/0048
See application file for complete search history.

(56) References Cited

U.S. PATENT DOCUMENTS

| 9,143,955 B2 * | 9/2015 | Zhang ................... H04W 48/08 |
| 2003/0040319 A1 * | 2/2003 | Hansen ................. H04W 16/10 455/452.1 |

(Continued)

FOREIGN PATENT DOCUMENTS

| CN | 102595417 A | 7/2012 |
| CN | 102821407 A | 12/2012 |

(Continued)

OTHER PUBLICATIONS

PCT International Search Report for PCT Counterpart Application No. PCT/CN2015/071630, 5 pp. (including English translation), (dated May 4, 2015).

(Continued)

*Primary Examiner* — Gennadiy Tsvey
(74) *Attorney, Agent, or Firm* — Womble Bond Dickinson (US) LLP

(57) ABSTRACT

The present invention relates to the technical field of wireless communications. Disclosed are a physical cell identifier allocation method and an apparatus. In a scheme, when allocating a physical cell identifier, first determining a degree of interference of each type of an adjacent cell to a main cell for which a physical cell identifier needs to be allocated, and then performing allocation for the main cell based on a remainder value corresponding to a minimum (Continued)

degree of interference, thus implementing effective reduction of reference signal interference and improving effectiveness of reducing reference signal interference.

14 Claims, 3 Drawing Sheets

(51) Int. Cl.
| | |
|---|---|
| H04W 16/10 | (2009.01) |
| H04W 24/10 | (2009.01) |
| H04B 17/318 | (2015.01) |
| H04B 17/336 | (2015.01) |
| H04L 5/00 | (2006.01) |

(52) U.S. Cl.
CPC .......... *H04L 5/0048* (2013.01); *H04W 16/10* (2013.01); *H04W 24/02* (2013.01); *H04W 24/10* (2013.01)

(56) References Cited

U.S. PATENT DOCUMENTS

| | | | |
|---|---|---|---|
| 2010/0020710 A1 | 1/2010 | Gupta et al. | |
| 2012/0093105 A1 | 4/2012 | Park et al. | |
| 2013/0215744 A1 | 8/2013 | Haswarey et al. | |
| 2014/0248896 A1* | 9/2014 | Kondo | H04W 72/085 455/452.2 |
| 2015/0155996 A1* | 6/2015 | Garcia | H04W 24/02 370/329 |
| 2015/0319611 A1* | 11/2015 | Garcia | H04W 16/18 370/329 |
| 2015/0319624 A1* | 11/2015 | Garcia | H04W 8/26 370/329 |
| 2015/0341951 A1* | 11/2015 | Sun | H04W 72/1273 370/330 |
| 2015/0373619 A1* | 12/2015 | Bhardwaj | H04W 24/02 455/434 |

FOREIGN PATENT DOCUMENTS

| | | |
|---|---|---|
| CN | 102958056 A | 3/2013 |
| CN | 103326807 A | 9/2013 |
| CN | 103747445 A | 4/2014 |
| EP | 2 785 087 A1 | 10/2014 |
| WO | WO 2013/077069 A1 | 5/2013 |
| WO | WO 2013/110329 A1 | 8/2013 |
| WO | WO 2014/086397 A1 | 6/2014 |

OTHER PUBLICATIONS

PCT Written Opinion of the International Searching Authority for PCT Counterpart Application No. PCT/CN2015/071630, 8 pp. (including English translation), (dated May 4, 2015).

PCT Notification Concerning Transmittal of International Preliminary Report on Patentability (Chapter 1 of the Patent Cooperation Treaty) for PCT Counterpart Application No. PCT/CN2015/071630, 13 pp. (including English translation), (dated Aug. 11, 2016).

European Patent Office Communication enclosing extended European Search Report for corresponding European Patent Application No. 15740266.0, 9 pp., (dated Oct. 19, 2016).

Jingjie Yu, et al., "A Physical Cell Identify Self-Organization Algorithm in LTE-Advanced Systems", IEEE 2012 7$^{th}$ International ICST Conference on Communications and Networking in China(CHINACOM), pp. 576-580, (2012).

Japanese Patent Office. Reasons for Refusal dated Jul. 11, 2017, for corresponding Japanese Patent Application No. 2016-548705 with English translation, 6 pages.

* cited by examiner

PHYSICAL CELL IDENTIFIER ALLOCATION METHOD AND APPARATUS

CROSS-REFERENCE TO RELATED APPLICATIONS

This patent application is a U.S. National Phase Application under 35 U.S.C. § 371 of International Application No. PCT/CN2015/071630, filed on Jan. 27, 2015, entitled PHYSICAL CELL IDENTIFIER ALLOCATION METHOD AND APPARATUS, which claims the benefit of Chinese Patent Application No. 201410039004.0, filed with the Chinese Patent Office on Jan. 27, 2014, and entitled "Method and apparatus for allocating a physical cell identifier", which was incorporated by reference in its entirety.

This application claims the benefit of Chinese Patent Application No. 201410039004.0, filed with the Chinese Patent Office on Jan. 27, 2014 and entitled "Method and apparatus for allocating a physical cell identifier", which is hereby incorporated by reference in its entirety.

FIELD

The present invention relates to the field of communications, and particularly to a method and apparatus for allocating a physical cell identifier.

BACKGROUND

Since physical cell identifiers (IDs) are bound with resource mapping, code resource configuration, frequency hopping, and other mechanisms in a one-to-one manner in a Time Division Long Term Evolution (TD-LTE) system, configuration of the physical cell identifiers plays an equivalent role to planning of scrambling codes in a Time Division Synchronization Code Division Multiple Access (TD-SCDMA) system, and is particularly important in co-frequency networking.

An initial value of a scrambling code in a physical channel is primarily determined by a physical cell identifier, and particularly in a broadcast channel and a control channel, correlation of a scrambling code in the control channel is determined by correlation of the physical cell identifier, no interference in the channel significantly depends upon the physical cell identifier.

Since the physical cell identifiers correspond to sequence index numbers of Primary Synchronization Codes (PSCs)/Secondary Synchronization Codes (SSCs) in a one-to-one manner, that is, the physical cell identifiers are related to distribution of reference signals. In order to avoid interference between reference signals generated in adjacent cells, the physical cell identifiers need to be allocated reasonably so that the reference signals between the adjacent cells are mapped onto different physical resources to thereby reduce interference between the reference signals.

In a real application, if there are identical remainders of the physical cell identifiers MOD 3, then there will be serious interference between the reference signals in the adjacent cells, so the physical cell identifiers are currently allocated generally by following the principle of avoiding the remainders of the physical cell identifiers between the adjacent cells from being identical. In the prior art, in order to avoid the remainders of the physical cell identifiers MOD 3 between the adjacent cells from being identical, the physical cell identifiers are allocated by determining priorities of the adjacent cells according to parameters of a network topology, e.g., distances, direction angles, simulated overlapping of coverage, etc., and then determining the adjacent cells with higher priorities an that it will suffice only if the physical cell identifiers MOD 3 of the adjacent cells with higher priorities are different from those of the present cell. For example, the most closest three adjacent cells are determined as adjacent cells with higher priorities, and it will suffice only if the physical cell identifier MOD 3 of the present cell is different from those of the adjacent cells with higher priorities. However the cells with the strongest interference indeed between them may not be the closest cells due to the topography, building, transmitted power, and other factors, and in this case, the requirement of interference-minimum between reference signals may not be satisfied in the existing physical cell identifiers allocation method.

In summary, the existing physical cell identifiers allocation method may not effectively reduce interference between reference signals.

SUMMARY

Embodiments of the invention provide a method and apparatus for allocating a physical cell identifier so as to improve the effectiveness for reducing interference between reference signals.

Particular technical solutions according to the embodiments of the invention are as follows:

A method for allocating a physical cell identifier includes:

obtaining cell wireless measurement index information of each sampling point associated with an allocation target cell for which a physical cell identifier needs to be allocated, wherein the cell wireless measurement index information characterizes a quality of signal of a cell;

determining a co-channel interference sampling point according to the cell wireless measurement index information, and determining an adjacent cell according to the cell wireless measurement index information of the co-channel interference sampling point;

determining a remainder of current physical cell identifier MOD 3 of the determined adjacent cells, and classifying adjacent cells with identical remainder into a same category; and determining a degree of interference from each of the categories of adjacent cells to the allocation target cell according to the cell wireless measurement index information, and allocating a physical cell identifier for the allocation target cell according to a remainder corresponding to the minimum interference degree.

An apparatus for allocating a physical cell identifier includes:

an obtaining unit configured to obtain cell wireless measurement index information of each sampling point associated with an allocation target cell for which a physical cell identifier needs to be allocated, wherein the cell wireless measurement index information characterizes a quality of signal of a cell;

a determining unit configured to determine a co-channel interference sampling point according to the cell wireless measurement index information, and to determine an adjacent cell according to the cell wireless measurement index information of the co-channel interference sampling point;

a categorizing unit configured to determine a remainder of current physical cell identifier MOD 3 of the determined adjacent cell, and to classify the adjacent cells with identical remainder into a same category; and an allocating unit configured to determine a degree of interference from each of the categories of adjacent cells to the allocation target cell according to the cell wireless measurement index information, and to allocate a physical cell identifier for the allocation target cell according to a remainder corresponding to the minimum interference degree.

Advantageous effects of the invention are as follows:

In the prior art, the physical cell identifiers are allocated by determining priorities of the adjacent cells according to the network topology, and allocating the physical cell identifier of the cell for which a physical cell identifier needs to be allocated, according to the physical cell identifiers of those cells with their determined priorities being higher, but the adjacent cells with their higher priorities determined according to the network topology may have a less influence upon the reference signal of the cell for which a physical cell identifier needs to be allocated, so that the effectiveness for reducing interference between the reference signals is low; while in the embodiments of the invention, firstly degrees of interference from adjacent cells to a primary cell for which a physical cell identifier needs to be allocated are determined, and further the physical cell identifier of the primary cell is allocated according to a remainder corresponding to the minimum interference degree, thereby interference between reference signals is reduced effectively, and the effectiveness for reducing interference between reference signals is improved.

DETAILED DESCRIPTION OF THE EMBODIMENTS

In order to make the objects, technical solutions, and advantages of the embodiments of the invention more apparent, the technical solutions according to the embodiments of the invention will he described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

Furthermore the terms "system" and "network" in this context can be used interchangeably. The term "and/or" in this context merely refers to an association between associated objects in three relationships, for example, A and/or B can refer to three possibilities of the presence of only A, both A and B, and only B. Furthermore the symbol "/" in this context generally refers to an "or" relationship between the former and latter associated objects.

In order to improve the effectiveness of reducing interference between reference signals, in embodiments of the invention, firstly degrees of interference from adjacent cells to a primary cell for which a physical cell identifier needs to be allocated are determined, and further the physical cell identifier of the primary cell is allocated according to a remainder corresponding to the minimum interference degree, thereby interference between reference signals is reduced effectively, and the effectiveness of reducing interference between reference signals is improved.

Preferred embodiments of the invention will be described below in details with reference to the drawings, and it shall be appreciated that the preferred embodiments described here are merely intended to illustrate and describe the invention, but not to limit the invention, and the embodiments and features thereof in the invention can be combined with each other unless there is confliction between them.

The preferred embodiments of the invention will be described below in details with reference to the drawings.

Figure 1:
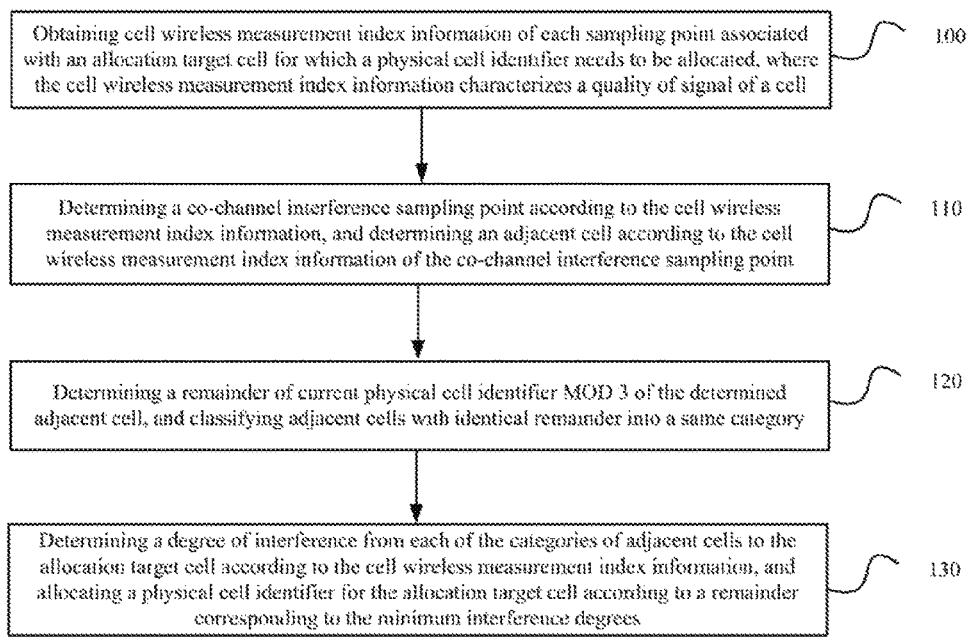
FIG. 1 illustrates a flow chart of a method for allocating a physical cell identifier according to an embodiment of the invention.

Referring to FIG. 1, a detailed flow of allocating a physical cell identifier according to an embodiment of the invention is as follows:

Operation 100: Obtaining cell wireless measurement index information of each sampling point associated with an allocation target cell for which a physical cell identifier needs to be allocated, where the cell wireless measurement index information characterizes a quality of signal of a cell;

Operation 110: Determining a co-channel interference sampling point according to the cell wireless measurement index information, and determining adjacent cells according to the cell wireless measurement index information of the co-channel interference sampling point;

Operation 120: Determining a remainder of current physical cell identifier MOD 3 of the determined adjacent cell, and classifying adjacent cells with identical remainder into a same category; and Operation 130: Determining a degree of interference from each of the categories of adjacent cells to the allocation target cell according to the cell wireless measurement index information, and allocating a physical cell identifier for the allocation target cell according to a remainder corresponding to the minimum interference degree.

In an embodiment of the invention, the cell wireless measurement index information includes a number of items, e.g., includes at least Reference Signal Received Power (RSRP) values, and Signal to Interference and Noise Ratio (SINR) values; and can further include other items in a real application, although a detailed description thereof will be omitted here.

Here the co-channel interference sampling point can be determined according to the cell wireless measurement index information preferably as follows:

A sampling point with its RSRP value below a preset threshold of weak coverage, and SINR value below a preset SINR threshold are determined as the co-channel interference sampling point.

For example, there are 10 sampling points associated with a cell A for which a physical cell identifier needs to be allocated, where each of the sampling point 1, the sampling point 2, the sampling point 3, . . . and the sampling point 10 corresponds to a RSRP value and a SINR value in the cell A, and for each of the sampling points, it is determined whether the sampling point is an interference sampling point, particularly by checking the corresponding RSRP value and SINR value in the cell A, and if the RSRP value in the cell A is below the preset threshold of weak coverage, and the SINR value in the cell A is below the preset SINR threshold, and then determining the sampling point as a co-channel interference sampling point. For example, the sampling point 1, the sampling point 2, the sampling point 3, the sampling point 4, and the sampling point 5 are determined as co-channel interference sampling points, and then 10 adjacent cells are determined according to the cell wireless measurement index information of the sampling point 1, the sampling point 2, the sampling point 3, the sampling point 4, and the sampling point 5; and then respective remainders of current physical cell identifiers MOD 3 of the determined 10 adjacent cells are determined, and adjacent cells with identical remainder are classified into a same category, and further a degree of interference from each of the 10 adjacent cells is calculated, and a physical cell identifier is allocated for the cell A according to the remainder corresponding to the minimum interference degree.

Although the co-channel interference sampling point is determined according to the cell wireless measurement index information as described above by way of an example, the co-channel interference sampling point can alternatively be determined variously, and a detailed description thereof will be omitted here.

In an embodiment of the invention, the cell wireless measurement index information of each sampling point includes the cell wireless measurement index information of the allocation target cell, but may not include the cell wireless measurement index information of the adjacent cells, that is, the cell wireless measurement index information of each sampling point includes the cell wireless measurement index information of the allocation target cell, and may or may not include the cell wireless measurement index information of the adjacent cells. As depicted in Table 1:

TABLE 1

Cell wireless measurement index information of sampling points

|  | Sampling point 1 | Sampling point 2 | Sampling point 3 | Sampling point 4 | Sampling point 5 |
|---|---|---|---|---|---|
| RSCP of allocation target cell | −95 | −96 | −96 | −96 | −96 |
| SINR of primary serving cell | 10 | 11 | 12 | 0 | 8 |
| RSCP of adjacent cell 1 | −95 |  | −95 |  |  |
| RSCP of adjacent cell 2 |  | −95 |  | −95 |  |
| RSCP of adjacent cell 3 |  |  |  | −95 | −95 |
| RSCP of adjacent cell 4 | −95 | −95 |  |  |  |
| RSCP of adjacent cell 5 | −95 |  |  | −95 | −95 |
| RSCP of adjacent cell 6 | −95 |  | −95 |  |  |
| RSCP of adjacent cell 7 |  |  |  | −95 | −95 |
| RSCP of adjacent cell 8 |  | −95 |  |  |  |
| RSCP of adjacent cell 9 | −95 | −95 | −95 | −95 |  |
| RSCP of adjacent cell 10 |  |  | −95 |  | −95 |
| RSCP of adjacent cell 11 | −95 |  |  |  | −95 |
| RSCP of adjacent cell 12 |  | −95 |  | −95 | −95 |
| ... |  |  |  |  |  |

In an embodiment of the invention, preferably the preset threshold of weak coverage is −100 dBm, and the preset SINR threshold is 80 dBm; and of course, they can alternatively be other values in a real application, although a detailed description thereof will be omitted here.

In order to improve the efficiency of calculating the interference degrees, after the adjacent cells are determined according to the cell wireless measurement index information of the co-channel interference sampling points, and before the respective remainders of the current physical cell identifiers MOD 3 of the determined adjacent cells are determined, and the adjacent cells with identical remainder are classified into a same category, the method further includes operation of determining a target interference adjacent cell, particularly as follows:

A first performance attribute value of each of the adjacent cells is calculated, where the first performance attribute value characterizes receive power strength of the adjacent cell; and An adjacent cell with its first performance attribute value above an adjacent cell interference threshold is determined as a target interference adjacent cell.

Here the respective remainders of the current physical cell identifiers MOD 3 of the determined adjacent cells are determined, and the adjacent cells with identical remainder are classified into a same category, particularly as follows:

The remainder of the current physical cell identifiers MOD 3 of each of the target interference adjacent cells is determined, and the adjacent cells with identical remainder are classified into a same category.

For example, if there are 10 determined adjacent cells, then in order to improve the efficiency of calculating the interference degrees, firstly adjacent cells with possible interference will be determined from the 10 adjacent cells as the target interference adjacent cells. For example, if there are 5 target interference adjacent cells, then the interference degrees will be calculated by calculating the degrees of interference from the 5 target interference adjacent cells, thus improving the efficiency of calculating the interference degrees.

In an embodiment of the invention, preferably the first performance attribute value is a RSRP value.

For example, if the RSRP value of a first adjacent cell is −100 dBm, which is above the adjacent cell interference threshold of −120 dBm, then the first adjacent cell will be a target interference adjacent cell.

In a real application, the target interference adjacent cells can alternatively be picked out otherwise among the adjacent cells, although a detailed description thereof will be omitted here.

In an embodiment of the invention, furthermore the respective remainders of current physical cell identifiers MOD 3 of the determined adjacent cells are determined, and the adjacent cells with identical remainder are classified into a same category.

For example, given 10 adjacent cells, if respective remainders of physical cell identifiers MOD 3 of an adjacent cell 1, an adjacent cell 2, and an adjacent cell 3 are 0, then the adjacent cell 1, the adjacent cell 2, and the adjacent cell 3 will belong to a first category of interference adjacent cells; if respective remainders of physical cell identifiers MOD 3 of an adjacent cell 4, an adjacent cell 5, and an adjacent cell 6 are 1, then the adjacent cell 4, the adjacent cell 5, and the adjacent cell 6 will belong to a second category of interference adjacent cells; and if respective remainders of physical cell identifiers MOD 3 of an adjacent cell 7, an adjacent cell 8, an adjacent cell 9, and an adjacent cell 10 are 2, then the adjacent cell 7, the adjacent cell 8, the adjacent cell 9, and the adjacent cell 10 will belong to a third category of interference adjacent cells.

Of course, in a real application, the categories of the adjacent cells of the allocation target cell can be one or more of the three categories above, although a detailed description thereof will be omitted here.

In an embodiment of the invention, the first performance attribute value of each adjacent cell can be calculated in a number of ways, and for example, preferably it can be calculated as follows:

The following operations are performed respectively for any one of the adjacent cells:

All of second performance attribute values corresponding to the adjacent cell are picked out from all the cell wireless measurement index information corresponding to all the interference sampling points, where any one of the second performance attribute values corresponding to the adjacent cell characterizes receive power strength of the adjacent cell; and The average of all the picked-out second performance attribute values is determined as the first performance attribute value of the adjacent cell.

As depicted in Table 1, for example, all sampling points from the sampling point 1 to the sampling point 5 are interference sampling points, and if the first performance attribute value of the adjacent cell 1, particularly the RSRP value of the adjacent 1, is calculated, then the average of the RSRP values −95 and −95 of the adjacent cell 1 respectively in the sampling point 1 and the sampling point 3, i.e., −95, will be determined as the RSRP value of the adjacent cell 1 because there is RSRP of the adjacent cell 1 in the sampling point 1 and the sampling point 3. The RSRP value of any one adjacent cell illustrated in Table 1 can be calculated similarly to that of the adjacent cell 1, so a detailed description thereof will be omitted here.

In an embodiment of the invention, the degree of interference from each of the categories of adjacent cells to the allocation target cell can be determined according to the cell wireless measurement index information in a number of ways, and for example, preferably it can be determined as follows:

For each category of adjacent cells, the degree of interference from each of the adjacent cells in the category is calculated, and the sum of the calculated degrees of interference from the respective interference cells in the category is determined as the degree of interference from the category of adjacent cells to the allocation target cell.

For example, given 10 adjacent cells, if there are 3 adjacent cells with such physical cell identifiers that remainders of the physical cell identifiers MOD 3 are 2, then a degree of interference from the category of adjacent cells with the remainders of 2 will be calculated by determining the sum of the degrees of interference from the 3 adjacent cells in the category as the degree of interference from the category of adjacent cells to the allocation target cell for which a physical cell identifier needs to be allocated.

In an embodiment of the invention, the degree of interference from each adjacent cell in the category can be calculated in a number of ways, and for example, preferably it can be determined as follows:

The following operations are performed respectively for any one of the adjacent cells:

All of associated interference sampling points with their corresponding cell wireless measurement index information including the second performance attribute values of the adjacent cell are determined;

For any one of the associated interference sampling points, a degree of sub-interference from the adjacent cell to the allocation target cell is calculated according to the cell wireless measurement index information corresponding to the associated sampling point, and the second performance attribute value for the adjacent cell, where the cell wireless measurement index information corresponding to the associated sampling point has a negative correlation with the sub-interference degree, and the second performance attribute value for the adjacent cell has a positive correlation with the sub-interference degree; and The sum of all the calculated sub-interference degrees is determined as the degree of interference from the adjacent cell.

If the cell wireless measurement index information of the allocation target cell is a RSRP value, and the second performance attribute value for the adjacent cell is also a RSRP value, then the sub-interference degree can be calculated according to the cell wireless measurement index information of the allocation target cell corresponding to the associated sampling point, and the second performance attribute value for the adjacent cell by Equation 1:

$$IS(i) = 1/10^{(RSCP\_max - RSCP\_i)/10} \quad \text{(Equation 1)}$$

Where RSCP_max represents a RSRP value of allocation target physical cell for which a physical cell identifier needs to be allocated; RSCP_i represents a RSRP value of an associated interference sampling point of an adjacent cell i for the adjacent cell i; and IS(i) represents a degree of sub-interference from the adjacent cell i to the allocation target cell.

As depicted in Table 1, for example, if a degree of interference from the adjacent cell 5 is calculated, since there are RSRP values of the adjacent cell 5 in the sampling point 1, the sampling point 4, and the sampling point 5, then the sampling point 1, the sampling point 4, and the sampling point 5 will be interference sampling points associated with the adjacent cell 5, and for any one of the sampling point 1, the sampling point 4, and the sampling point 5 for the adjacent cell 5, for example, for the sampling point 4, the degree of sub-interference from the adjacent cell 5 to the allocation target cell 1 will be calculated by Equation 1, and if RSCP_i is −95, RSCP_max is −96, so the sub-interference degree 1 can be calculated; and alike the sub-interference degree 2 for the sampling point 1 can be calculated, and the sub-interference degree 3 for the sampling point 5 can be calculated, and further the sum of the sub-interference degree 1, the sub-interference degree 2, and the sub-interference degree 3 can be determined as the degree of interference from the adjacent cell to the allocation target cell 1.

In an embodiment of the invention, a physical cell identifier can be allocated for the allocation target cell according to the remainder corresponding to the minimum interference degree in a number of ways, and preferably it can be calculated as follows:

The remainder corresponding to the minimum interference degree is determined as a Primary Synchronization Signal (PSS) in the physical cell identifier of the allocation target cell.

For example, the interference degrees corresponding to the respective categories of adjacent cells are as depicted in Table 2:

TABLE 2

| | Interference degrees | | |
|---|---|---|---|
| | Remainder of 0 | Remainder of 1 | Remainder of 2 |
| Interference degree | 0.387298492 | 2.616417793 | 0.217379634 |

As can be apparent from Table 2, if the physical cell identifier is divided by 2, then the resulting interference degree will be the minimum, so the value of a PSS in the current physical cell identifier of the cell for which a physical cell identifier needs to be allocated is modified to 2.

Since the physical cell identifier is 3*Group ID (S-SS)+Sector ID (P-SS), the SSS can be updated along with a varying application scenario after the PSS is determined, where the SSS is selected under the following principle:

Since a reuse distance of a physical cell identifier should be a interval of at least four layers of cells, which is greater than 5 times of coverage radius of a cell, then a Secondary Synchronization Signal (SSS) occurred in a radius range of distances which are 4 kilometers from the cell for which a physical cell identifier needs to be allocated will not be selected, and others can be determined as a candidate set from which the SSS can be selected randomly.

Figure 2:
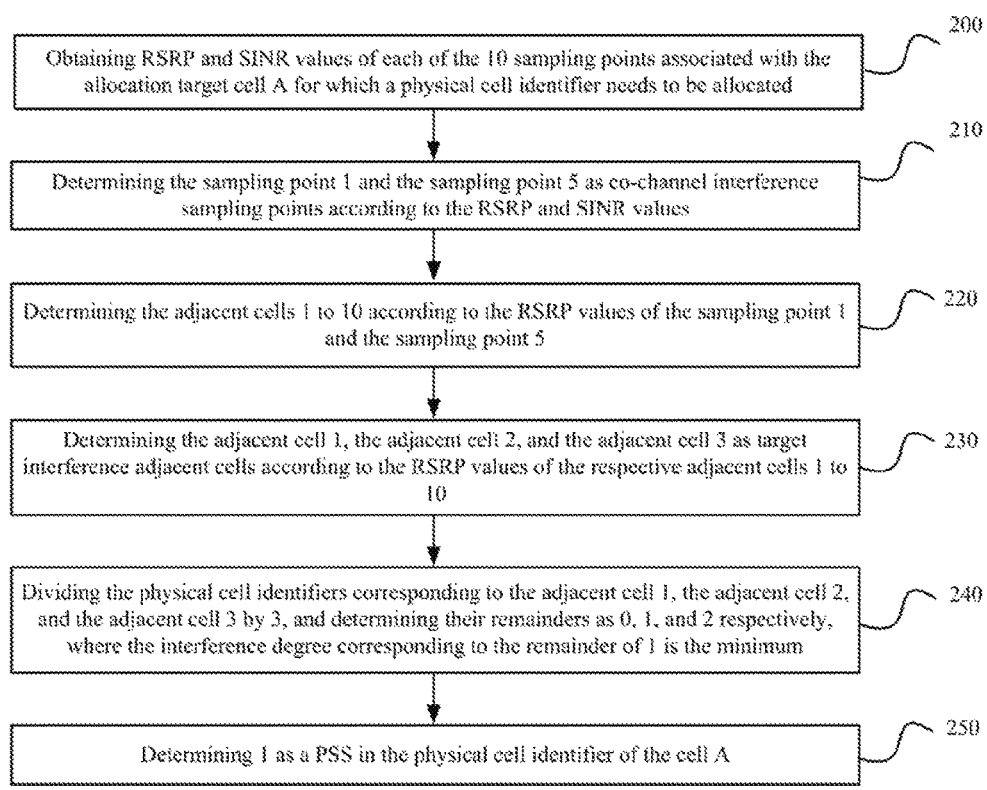
FIG. 2 illustrates an embodiment of the invention in which physical cell identifiers are allocated.

In order to better understand the embodiments of the invention, a process of allocating a physical cell identifier in a particular application scenario will be described below in further details, particularly as illustrated in FIG. 2.

Operation 200: Obtaining RSRP and SINR values of each of the 10 sampling points associated with the allocation target cell A for which a physical cell identifier needs to be allocated;

Operation 210: Determining the sampling point 1 and the sampling point 5 as co-channel interference sampling points according to the RSRP and SINR values;

Operation 220: Determining the adjacent cells 1 to 10 as the adjacent cells according to the RSRP values of the sampling point 1 and the sampling point 5;

Operation 230: Determining the adjacent cell 1, the adjacent cell 2, and the adjacent cell 3 as target interference adjacent cells according to the RSRP values of the respective adjacent cells 1 to 10;

Operation 240: Dividing the physical cell identifiers corresponding to the adjacent cell 1, the adjacent cell 2, and the adjacent cell 3 by 3, and determining their remainders as 0, 1, and 2 respectively, where the interference degree corresponding to the remainder of 1 is the minimum; and Operation 250: Determining 1 as a PSS in the physical cell identifier of the cell A.

Figure 3:
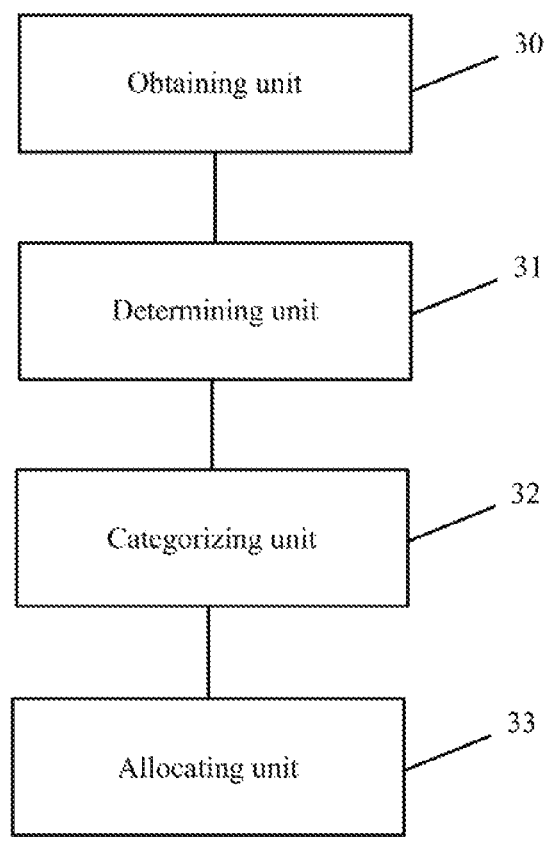
FIG. 3 illustrates a schematic diagram of functional structure for allocating a physical cell identifier according to an embodiment of the invention.

As illustrated in FIG. 3, an embodiment of the invention provides an apparatus for allocating a physical cell identifier, which includes an obtaining unit 30, a determining unit 31, a categorizing unit 32, and an allocating unit 33, where:

The obtaining unit 30 is configured to obtain cell wireless measurement index information of each sampling point associated with an allocation target cell for which a physical cell identifier needs to be allocated, where the cell wireless measurement index information characterizes a quality of signal of a cell;

The determining unit 31 is configured to determine a co-channel interference sampling point according to the cell wireless measurement index information, and to determine an adjacent cell according to the cell wireless measurement index information of the co-channel interference sampling point;

The categorizing unit 32 is configured to determine a remainder of current physical cell identifier MOD 3 of the determined adjacent cell, and to classify adjacent cells with identical remainder into a same category; and The allocating unit 33 is configured to determine a degree interference from each of the categories of adjacent cells to the allocation target cell according to the cell wireless measurement index information, and to allocate a physical cell identifier for the allocation target cell according to a remainder corresponding to the minimum interference degree.

Preferably in an embodiment of the invention, the cell wireless measurement index information obtained by the obtaining unit 30 includes at least a RSRP value and a SINR value; and The determining unit 31 is configured:

To determine a sampling point with its RSRP value below a preset threshold of weak coverage, and a SINR value below a preset SINR threshold as the co-channel interference sampling point.

Furthermore in an embodiment of the invention, the determining unit 31 is further configured:

To calculate a first performance attribute value of each of the adjacent cells, where the first performance attribute value characterizes receive power strength of the adjacent cell; and To determine an adjacent cell with its first performance attribute value above an adjacent cell interference threshold as target interference adjacent cell; and The categorizing unit 32 is configured:

To determine a remainder of the current physical cell identifiers MOD 3 of the target interference adjacent cell, and to classify adjacent cells with identical remainder into a same category.

Preferably in an embodiment of the invention, the determining unit 31 configured to calculate the first performance attribute value of each adjacent cell is configured:

To perform the following operations respectively for any one of the adjacent cells:

picking out all of second performance attribute values corresponding to the adjacent cell from all the cell wireless measurement index information corresponding to all the interference sampling points, where any one of the second performance attribute values corresponding to the adjacent cell characterizes receive power strength of the adjacent cell; and determining the average of all the picked-out second performance attribute values as the first performance attribute value of the adjacent cell.

Preferably in an embodiment of the invention, the allocating unit 33 is configured:

For each category of adjacent cells, to calculate the degree of interference from each of the adjacent cells in the category, and to determine the sum of the calculated degrees of interference from the respective interference cells in the category as the degree of interference from the category of adjacent cells to the allocation target cell.

Preferably in an embodiment of the invention, the allocating unit 33 configured to calculate the degree of interference from each of the adjacent cells in the category is configured:

To perform the following operations respectively for any one of the adjacent cells:

determining all of associated interference sampling points with their corresponding cell wireless measurement index information including the second performance attribute values of the adjacent cell;

For any one of the associated interference sampling points, calculating a degree of sub-interference from the adjacent cell to the allocation target cell according to the cell wireless measurement index information of the allocation target cell corresponding to the associated sampling point, and the second performance attribute value for the adjacent cell, where the cell wireless measurement index information corresponding to the associated sampling point has a negative correlation with the sub-interference degree, and the second performance attribute value for the adjacent cell has a positive correlation with the sub-interference degree; and determining the sum of all the calculated sub-interference degrees as the degree of interference front the adjacent cell.

Preferably in an embodiment of the invention, the allocating unit 33 is configured:

To determine the remainder corresponding to the minimum interference degree as a PSS in the physical cell identifier of the allocation target cell.

In summary, in the embodiments of the invention, in order to improve the effectiveness for reducing interference between reference signals, the following solution is proposed: cell wireless measurement index information of each sampling point associated with an allocation target cell for which a physical cell identifier needs to be allocated is obtained, where the cell wireless measurement index information characterizes a quality of signal of a cell; co-channel interference sampling points are determined according to the cell wireless measurement index information, and adjacent cells are determined according to the cell wireless measurement index information of the co-channel interference sampling points; remainders of current physical cell identifiers MOD 3 of the determined adjacent cells are determined, and the adjacent cells with identical remainder are classified into a same category; and a degree of interference from each of the categories of adjacent cells to the allocation target cell is determined according to the cell wireless measurement index information, and a physical cell identifier for the allocation target cell is allocated according to a remainder corresponding to the least one of the interference degrees; and in this solution, firstly the degrees of interference from the adjacent cells to the primary cell for which a physical cell identifier needs to be allocated are determined, and then the physical cell identifier of the primary cell is allocated according to the remainder corresponding to the minimum interference degree, thereby interference between reference signals is reduced effectively, and the effectiveness for reducing interference between reference signals is improved.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can he embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process an that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for allocating a physical cell identifier, the method comprising:
    obtaining, by a network device, cell wireless measurement index information of each of sampling points associated with an allocation target cell for which a physical cell identifier needs to be allocated, wherein the cell wireless measurement index information characterizes a quality of signal of a cell, and the cell wireless measurement index information comprises at least a Reference Signal Receive Power, RSRP, value and a Signal to Interference and Noise Ratio, SINR, value;
    determining, by the network device, a co-channel interference sampling point from the sampling points associated with the allocation target cell according to the cell wireless measurement index information, and determining an adjacent cell according to the cell wireless measurement index information of the co-channel interference sampling point;
    determining, by the network device, a remainder of current physical cell identifier MOD 3 of the determined adjacent cells, and classifying adjacent cells with identical remainder into a same category; and
    determining, by the network device, a degree of interference from each of categories of adjacent cells to the allocation target cell according to the cell wireless measurement index information, and allocating a physical cell identifier for the allocation target cell according to a remainder corresponding to a minimum interference degree;
    wherein determining the degree of interference from each of the categories of adjacent cells to the allocation target cell according to the cell wireless measurement index information comprises:
    for each category of adjacent cells, calculating a degree of interference from each of the adjacent cells in the category, and determining a sum of the calculated degrees of interference from respective adjacent cells in the category as the degree of interference from the category of adjacent cells to the allocation target cell.

2. The method according to claim 1, wherein determining the co-channel interference sampling point according to the cell wireless measurement index information comprises:
    determining a sampling point with its RSRP value below a preset threshold of weak coverage, and a SINR value below a preset SINR threshold as the co-channel interference sampling point.

3. The method according to claim 2, wherein after the adjacent cell is determined according to the cell wireless measurement index information of the co-channel interference sampling point, and before the remainder of the current physical cell identifier MOD 3 of the determined adjacent cells is determined, and the adjacent cells with identical remainders are classified into the same category, the method further comprises:
    calculating a first performance attribute value of each of the adjacent cells, wherein the first performance attribute value characterizes receive power strength of the adjacent cell; and determining an adjacent cell with its first performance attribute value above an adjacent cell interference threshold as a target interference adjacent cell; and determining the remainder of the current physical cell identifier MOD 3 of the determined adjacent cell, and classifying the adjacent cells with identical remainders into the same category comprises:

determining a remainder of the current physical cell identifier MOD 3 of the target interference adjacent cell, and classifying the adjacent cells with identical remainder into the same category.

4. The method according to claim 1, wherein after the adjacent cell is determined according to the cell wireless measurement index information of the co-channel interference sampling point, and before the remainder of the current physical cell identifier MOD 3 of the determined adjacent cells is determined, and the adjacent cells with identical remainders are classified into the same category, the method further comprises:

calculating a first performance attribute value of each of the adjacent cells, wherein the first performance attribute value characterizes receive power strength of the adjacent cell; and determining an adjacent cell with its first performance attribute value above an adjacent cell interference threshold as a target interference adjacent cell; and determining the remainder of the current physical cell identifier MOD 3 of the determined adjacent cell, and classifying the adjacent cells with identical remainders into the same category comprises:

determining a remainder of the current physical cell identifier MOD 3 of the target interference adjacent cell, and classifying the adjacent cells with identical remainder into the same category.

5. The method according to claim 4, wherein calculating the first performance attribute value of each of the adjacent cells comprises:

performing following operations respectively for any one of the adjacent cells:

picking out all of second performance attribute values corresponding to the adjacent cell from all the cell wireless measurement index information corresponding to all interference sampling points, wherein any one of the second performance attribute values corresponding to the adjacent cell characterizes receive power strength of the adjacent cell; and determining an average of all the picked-out second performance attribute values as the first performance attribute value of the adjacent cell.

6. The method according to claim 1, wherein calculating the degree of interference from each of the adjacent cells in the category comprises:

performing following operations respectively for any one of the adjacent cells:

determining all of associated interference sampling points with their corresponding cell wireless measurement index information comprising second performance attribute values of the adjacent cell;

for any one of the associated interference sampling points, calculating a degree of sub-interference from the adjacent cell to the allocation target cell according to the cell wireless measurement index information of the allocation target cell corresponding to the associated interference sampling point, and the second performance attribute value for the adjacent cell, wherein the cell wireless measurement index information corresponding to the associated interference sampling point has a negative correlation with the sub-interference degree, and the second performance attribute value for the adjacent cell has a positive correlation with the sub-interference degree; and determining a sum of all the calculated sub-interference degrees as the degree of interference from the adjacent cell.

7. The method according to claim 1, wherein allocating the physical cell identifier for the allocation target cell according to the remainder corresponding to the minimum interference degree comprises:

determining a remainder corresponding to the minimum interference degree as a Primary Synchronization Signal, PSS, in the physical cell identifier of the allocation target cell.

8. An apparatus for allocating a physical cell identifier, comprising:

a processor; and a memory storing at least one instruction, wherein the processor is configured to execute the at least one instruction to:

obtain cell wireless measurement index information of each of sampling points associated with an allocation target cell for which a physical cell identifier needs to be allocated, wherein the cell wireless measurement index information characterizes a quality of signal of a cell, and the cell wireless measurement index information comprises at least a Reference Signal Receive Power, RSRP, value and a Signal to Interference and Noise Ratio, SINR, value;

determine a co-channel interference sampling point from the sampling points associated with the allocation target cell according to the cell wireless measurement index information, and to determine an adjacent cell according to the cell wireless measurement index information of the co-channel interference sampling point;

determine a remainder of current physical cell identifier MOD 3 of the determined adjacent cell, and to classify adjacent cells with identical remainder into a same category; and determine a degree of interference from each of the categories of adjacent cells to the allocation target cell according to the cell wireless measurement index information, and to allocate a physical cell identifier for the allocation target cell according to a remainder corresponding to a minimum interference degree;

wherein the processor is further configured to execute the at least one instruction to:

for each category of adjacent cells, calculate a degree of interference from each of the adjacent cells in the category, and determine a sum of the calculated degrees of interference from respective adjacent cells in the category as the degree of interference from the category of adjacent cells to the allocation target cell.

9. The apparatus according to claim 8, wherein the processor is further configured to execute the last least one instruction to:

determine a sampling point with its RSRP value below a preset threshold of weak coverage, and a SINR value below a preset SINR threshold as the co-channel interference sampling point.

10. The apparatus according to claim 9, wherein the processor is further configured to execute the last least one instruction to:

calculate a first performance attribute value of each of the adjacent cells, wherein the first performance attribute value characterizes receive power strength of the adjacent cell; and determine an adjacent cell with its first performance attribute value above an adjacent cell interference threshold as a target interference adjacent cell; and the processor is further configured to execute the last least one instruction to:

determine a remainder of the current physical cell identifier MOD 3 of the target interference adjacent cell, and to classify the adjacent cells with identical remainder into the same category.

11. The apparatus according to claim 8, wherein the processor is further configured to execute the last least one instruction to:

calculate a first performance attribute value of each of the adjacent cells, wherein the first performance attribute value characterizes receive power strength of the adjacent cell; and determine an adjacent cell with its first performance attribute value above an adjacent cell interference threshold as a target interference adjacent cell; and the processor is further configured to execute the last least one instruction to:

determine a remainder of the current physical cell identifier MOD 3 of the target interference adjacent cell, and to classify the adjacent cells with identical remainder into the same category.

12. The apparatus according to claim 11, wherein the processor is further configured to execute the last least one instruction to:

for any one of the adjacent cells:

pick out all of second performance attribute values corresponding to the adjacent cell from all the cell wireless measurement index information corresponding to all interference sampling points, wherein any one of the second performance attribute values corresponding to the adjacent cell characterizes receive power strength of the adjacent cell; and determine an average of all the picked-out second performance attribute values as the first performance attribute value of the adjacent cell.

13. The apparatus according to claim 8, wherein the processor is further configured to execute the last least one instruction to:

perform following operations respectively for any one of the adjacent cells:

determine all of associated interference sampling points with their corresponding cell wireless measurement index information including second performance attribute values of the adjacent cell;

for any one of the associated interference sampling points, calculate a degree of sub-interference from the adjacent cell to the allocation target cell according to the cell wireless measurement index information of the allocation target cell corresponding to the associated interference sampling point, and the second performance attribute value for the adjacent cell, wherein the cell wireless measurement index information corresponding to the associated interference sampling point has a negative correlation with the sub-interference degree, and the second performance attribute value for the adjacent cell has a positive correlation with the sub-interference degree; and determine a sum of all the calculated sub-interference degrees as the degree of interference from the adjacent cell.

14. The apparatus according to claim 8, wherein the processor is further configured to execute the last least one instruction to:

determine a remainder corresponding to the minimum interference degree as a Primary Synchronization Signal, PSS, in the physical cell identifier of the allocation target cell.

\* \* \* \* \*